(12) United States Patent
Rebreanu et al.

(10) Patent No.: US 9,354,638 B2
(45) Date of Patent: May 31, 2016

(54) DOUBLE PORT PRESSURE REGULATOR WITH FLOATING SEAT

(71) Applicant: EMERSON PROCESS MANAGEMENT REGULATOR TECHNOLOGIES, INC., McKinney, TX (US)

(72) Inventors: Silviu V. Rebreanu, Cluj-Napoca (RO); Istvan Bartha, Odorheiu-Secuiesc (RO); Florin R. Roman, Reichenbach (DE); Vlad Cristinel Hanceanu, Cluj (RO); Aaron P. Oprean, Floresti (RO)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 98 days.

(21) Appl. No.: 14/227,633

(22) Filed: Mar. 27, 2014

(65) Prior Publication Data

US 2015/0276072 A1    Oct. 1, 2015

(51) Int. Cl.
*F16K 1/44* (2006.01)
*G05D 16/06* (2006.01)
*F16K 1/00* (2006.01)

(52) U.S. Cl.
CPC .............. *G05D 16/0655* (2013.01); *F16K 1/00* (2013.01); *F16K 1/44* (2013.01); *G05D 16/0605* (2013.01); *Y10T 137/7823* (2015.04);
(Continued)

(58) Field of Classification Search
CPC ...................... Y10T 137/782; Y10T 137/7821; Y10T 137/7822; Y10T 137/7823; Y10T 137/7824; Y10T 137/7825; Y10T 137/7826; Y10T 137/7827; Y10T 137/86928; Y10T 137/86936; Y10T 137/89265; Y10T 137/8733; Y10T 137/8741; Y10T 137/86718–137/86807; G05D 16/0605; G05D 16/0638; G05D 16/0694; G05D 16/0655; F16K 1/42; F16K 1/44; F16K 1/00
USPC ............. 137/505.36–505.43, 599.01, 599.09, 137/601.01, 625.28–625.39, 628–630.22; 251/170, 174, 176, 178
See application file for complete search history.

(56) References Cited

U.S. PATENT DOCUMENTS

| 219,625 | A | * | 9/1879 | Dickey | ............... | G05D 16/0655 137/505.41 |
| 220,202 | A | * | 9/1879 | Wilder | ............... | G05D 16/0661 137/505.39 |
| 251,035 | A | * | 12/1881 | Freeman | ............. | F16K 31/0655 137/495 |

(Continued)

OTHER PUBLICATIONS

Search Report for International application No. PCT/US2015/022873, mailed Jun. 10, 2015.

(Continued)

*Primary Examiner* — William McCalister
(74) *Attorney, Agent, or Firm* — Marshall, Gerstein & Borun LLP

(57) ABSTRACT

A double port regulator assembly includes a first fluid port and a second fluid port. A fixed valve seat assembly is disposed proximate the first fluid port and a floating valve seat assembly is disposed proximate the second fluid port. A first valve plug cooperates with the fixed valve seat assembly to open and close the first fluid port and a second valve lug cooperates with the floating valve seat assembly to open and close the second fluid port. The floating valve seat assembly includes a floating valve seat that is movable with respect to the fixed valve seat.

10 Claims, 2 Drawing Sheets

(52) U.S. Cl.
CPC ..... *Y10T 137/7845* (2015.04); *Y10T 137/7846* (2015.04); *Y10T 137/86928* (2015.04); *Y10T 137/8741* (2015.04)

(56) References Cited

U.S. PATENT DOCUMENTS

| | | | | |
|---|---|---|---|---|
| 324,762 | A * | 8/1885 | Fleischer et al. ... | G05D 16/0661 137/505.39 |
| 384,883 | A * | 6/1888 | Williams ............... | F16K 3/188 137/625.37 |
| 417,136 | A * | 12/1889 | Bell ...................... | F25B 41/062 137/243.7 |
| 424,199 | A * | 3/1890 | Haskell .................. | F16K 17/00 137/462 |
| 609,386 | A * | 8/1898 | Dean .................. | F04B 43/0736 137/625.39 |
| 976,055 | A * | 11/1910 | Duham ............. | F02M 37/0023 137/196 |
| 1,567,183 | A * | 12/1925 | Conrader ................ | E21B 34/02 137/500 |
| 1,586,418 | A * | 5/1926 | Frederiksen ........... | F16K 31/58 137/625.12 |
| 1,813,222 | A * | 7/1931 | Barrett .................... | F16K 39/022 137/328 |
| 1,840,564 | A * | 1/1932 | Brown .................. | F16K 39/022 137/625.36 |
| 2,001,534 | A * | 5/1935 | Hughes ............. | G05D 16/0647 137/505.23 |
| 2,014,968 | A * | 9/1935 | Hughes ............... | G05D 16/163 137/484.2 |
| 2,336,653 | A * | 12/1943 | Taylor .................... | F16K 47/02 137/625.3 |
| 2,425,439 | A * | 8/1947 | Puster ................ | G05D 23/1333 137/115.13 |
| 2,717,003 | A * | 9/1955 | Bertram .................... | F16K 1/44 137/625.34 |
| 2,720,892 | A * | 10/1955 | Mitchell ............ | G05D 16/0663 137/505.37 |
| 2,768,509 | A * | 10/1956 | Bateman ................ | F25B 13/00 137/601.01 |
| 2,880,748 | A * | 4/1959 | Elsey ........................ | F16K 1/44 137/270 |
| 2,916,047 | A * | 12/1959 | Butcher ............... | G05D 7/0106 137/501 |
| 2,918,087 | A | 12/1959 | Curran | |
| 2,925,824 | A * | 2/1960 | Rockwell ............. | G05D 16/163 137/490 |
| 2,962,039 | A * | 11/1960 | Shand ............... | F16K 31/52433 137/219 |
| 2,963,261 | A * | 12/1960 | Holl ........................ | F16K 3/085 251/172 |
| 2,984,450 | A * | 5/1961 | Doe ........................ | F16K 1/44 137/625.34 |
| 2,993,507 | A * | 7/1961 | Daly .................. | G05D 16/0655 137/505.42 |
| 3,025,873 | A * | 3/1962 | Ray .................... | G05D 16/0655 137/454.2 |
| 3,035,608 | A * | 5/1962 | Ray .................... | G05D 16/0655 137/505.18 |
| 3,153,424 | A * | 10/1964 | Acker ................ | G05D 16/0663 137/484.8 |
| 3,193,250 | A * | 7/1965 | Good ...................... | F16K 1/422 251/174 |
| 3,453,884 | A * | 7/1969 | Marx ........................ | G01F 7/00 137/625.28 |
| 3,545,465 | A * | 12/1970 | Zadoo .................... | B64D 13/02 137/116.5 |
| 3,583,426 | A * | 6/1971 | Feres ................... | B67C 3/28 137/240 |
| 3,646,969 | A * | 3/1972 | Stampfli ............... | F16K 11/048 137/625.66 |
| 3,680,597 | A * | 8/1972 | Obermaier ............. | F16K 11/16 137/607 |
| 3,720,234 | A * | 3/1973 | Gorgens et al. ........... | F16K 1/44 137/625.36 |
| 3,779,275 | A * | 12/1973 | Ley ........................ | F16K 11/00 137/505.18 |
| 3,799,131 | A * | 3/1974 | Bolton ................. | F02B 75/22 123/568.29 |
| 3,821,968 | A | 7/1974 | Barb | |
| 3,836,116 | A * | 9/1974 | Noiles .................. | F16K 31/383 137/596.14 |
| 3,884,268 | A * | 5/1975 | Wagner ..................... | F16K 1/44 137/625.36 |
| 4,460,014 | A * | 7/1984 | Mases ..................... | F16K 1/446 137/240 |
| 4,479,670 | A * | 10/1984 | Gabler .................. | F16K 3/0263 251/174 |
| 4,505,292 | A * | 3/1985 | Osterode .............. | B65D 90/626 137/240 |
| 4,572,239 | A * | 2/1986 | Koch .................. | F16K 11/0873 137/312 |
| 4,778,148 | A * | 10/1988 | Kruger ...................... | F01L 7/16 123/190.17 |
| 5,388,613 | A * | 2/1995 | Kruger .................. | A62B 9/022 137/625.34 |
| 5,580,031 | A * | 12/1996 | Lorch ....................... | F16K 1/42 137/454.5 |
| 6,006,732 | A * | 12/1999 | Oleksiewicz ........... | F02B 75/22 123/568.11 |
| 6,247,461 | B1 * | 6/2001 | Smith .................. | F02M 25/0772 123/568.2 |
| 6,279,552 | B1 * | 8/2001 | Okada ................ | F02M 25/0744 123/568.2 |
| 6,286,550 | B1 * | 9/2001 | Yamaki ..................... | F16K 1/443 137/312 |
| 6,386,234 | B2 * | 5/2002 | Sontag ..................... | F16K 1/443 137/625.34 |
| 6,928,995 | B1 * | 8/2005 | Hrytzak ............ | F02M 25/0744 123/568.2 |
| 2006/0260692 | A1 * | 11/2006 | Pechtold ............ | G05D 16/0672 137/505.42 |

OTHER PUBLICATIONS

Written Opinion for International application No. PCT/US2015/022873, mailed Jun. 10, 2015.

* cited by examiner

DOUBLE PORT PRESSURE REGULATOR WITH FLOATING SEAT

BACKGROUND

1. Field of the Disclosure

The disclosure relates generally to double port pressure regulators and more specifically to double port pressure regulators having a fixed seat and a floating seat.

2. Related Technology

Pressure regulators and pressure regulating valves are used in myriad industrial and residential applications for controlling the downstream pressure of a fluid. For example, in chemical processing plants or oil refineries, pressure regulating valves are used to manipulate a flowing fluid to compensate for increases or decreases in demand, or other load disturbances, and thus keep the fluid pressure regulated. Similarly, pressure regulating valves may be used in plumbing fixtures to maintain a pre-determined pressure of fluid that automatically adjusts to variations in demand, such as anti-scald valves in showers or faucets. By controlling downstream pressure, pressure regulating valves compensate for variations in downstream demand. For example, as downstream demand increases, pressure regulating valves open to allow more fluid to flow through the pressure regulating valve, thus maintaining a relatively constant downstream pressure. On the other hand, as downstream demand decreases, pressure regulating valves close to reduce the amount of fluid flowing through the pressure regulating valve, again maintaining a relatively constant downstream pressure.

One type of pressure regulating valve is the double port regulator. Double port regulators include a single fluid inlet that branches into two fluid exit ports. Each fluid exit port has its own valve plug and valve seat. Double port regulators have the advantage of providing high flow rates. However, double port regulators suffer from the problems of requiring very tight machining tolerances to assure that both seats completely simultaneously shut off when the valve is closed.

SUMMARY OF THE DISCLOSURE

According to some aspects, a floating valve seat is included in a double port regulator or a double port regulator assembly to improve shutoff characteristics and to reduce machining tolerance requirements.

In one exemplary arrangement, a double port assembly includes a first fluid port and a second fluid port, a valve stem that extends through both the first fluid port and the second fluid port, the valve stem including a first valve plug and a second valve plug, a first fixed valve seat assembly proximate the first fluid port, and a second floating valve seat assembly proximate the second port.

In another exemplary arrangement, a double port regulator includes a valve body having a fluid inlet and a fluid outlet connected by a fluid passageway, a first fluid port disposed within the fluid passageway, a second fluid port disposed within the fluid passageway, a fixed valve seat assembly disposed proximate the first fluid port, a floating valve seat assembly disposed proximate the second fluid port, a first valve plug that cooperates with the first valve seat assembly to open and close the first fluid port, and a second valve plug that cooperates with the floating valve seat assembly to open and close the second fluid port.

In accordance with the teachings of the disclosure, any one or more of the foregoing aspects and/or exemplary aspects of a double port regulator or a double port regulator assembly may further include any one or more of the following optional forms.

In some optional forms, a double port assembly or a double port regulator may include a floating seat retainer having a through bore that forms the first fluid port, and a floating seat disposed at least partially within the floating seat retainer, the floating seat being movable along a longitudinal axis of the floating seat retainer. Other optional forms may include a floating seat retainer having an annular shoulder that forms a space between the floating seat retainer and the floating seat. Yet other optional forms may include a biasing element disposed within the space between the floating seat retainer and the floating seat, in some optional forms the biasing element may be a disc spring.

Still other optional forms may include a floating seat retainer having a first portion having a first inner diameter, a second portion having a second inner diameter, and a third portion having a third inner diameter, the first inner diameter being smaller than the second inner diameter, and the second inner diameter being smaller than the third inner diameter. Other optional forms may include a floating seat having a lower flange that is at least partially disposed within the third portion. Yet other optional forms may include a chamfered surface on an outer surface of the lower flange. Still other optional forms may include a chamfered surface proximate a first end of the floating seat.

Yet other optional forms may include a retainer element disposed on the floating seat retainer, the retainer element limiting longitudinal movement of the floating valve seat. In some optional forms the retainer element may be an annular disc. In yet other optional forms, the retainer element may include a base portion connected to a retaining portion by an angled portion. In still other optional forms, the retaining portion may be offset from the floating retainer by a tolerance gap. In some optional forms, the tolerance gap is preferably between 50% and 75% of the flange height of the floating seat.

BRIEF DESCRIPTION OF THE DRAWINGS

Objects, features, and advantages of the present invention will become apparent upon reading the following description in conjunction with the drawing figures, in which.

DETAILED DESCRIPTION

Certain examples are shown in the above-identified figures and described in detail below. The figures are not necessarily to scale and certain features and certain views of the figures may be shown exaggerated in scale or in schematic for clarity and/or conciseness. Additionally, any features from any exemplary embodiment may be included with, a replacement for, or otherwise combined with other features to form other embodiments.

Figure 1:
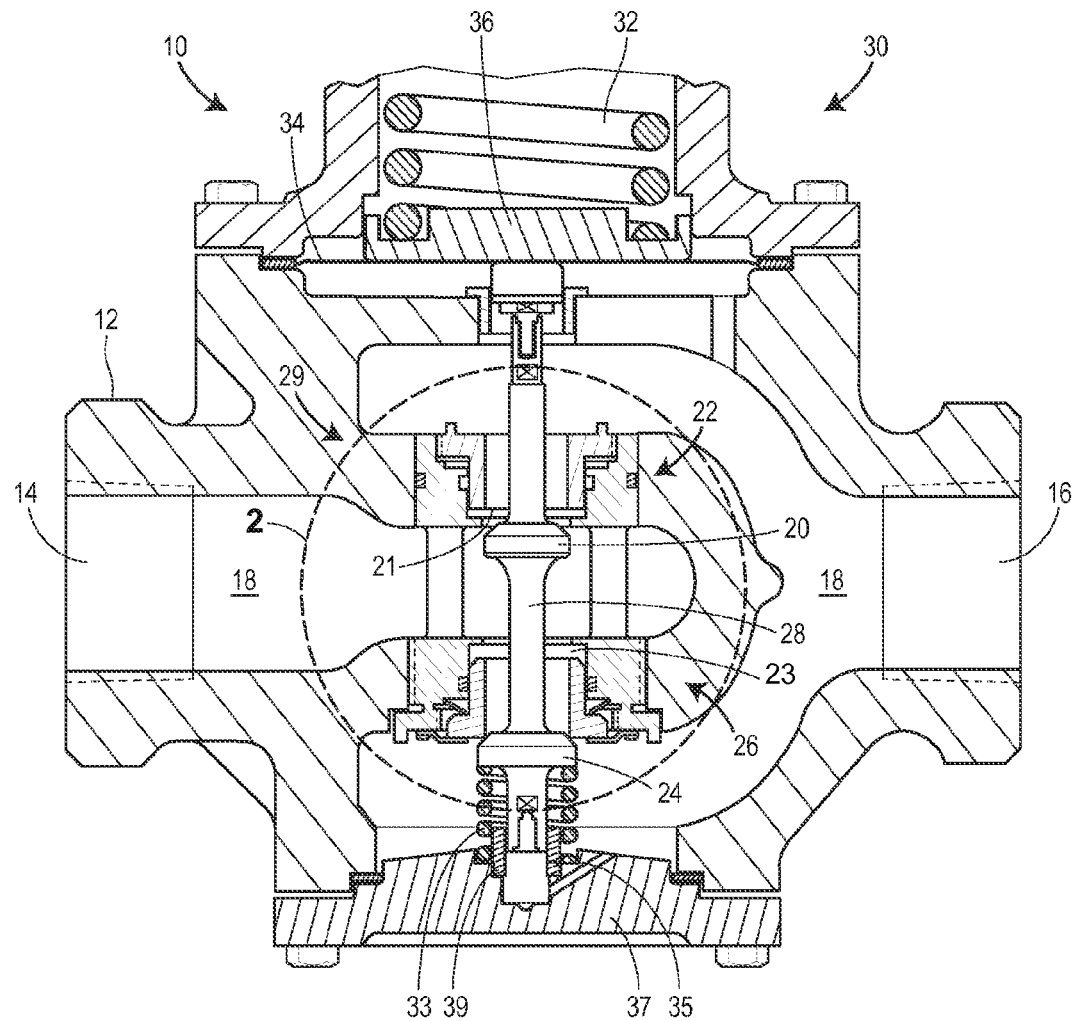
FIG. 1 is a cross-sectional view of a double port pressure regulator having a floating seat.

Turning now to FIG. 1, a double port pressure regulator 10 is illustrated that is constructed in accordance with the teachings of the disclosure. The double port pressure regulator 10 includes a valve body 12 having a fluid inlet 14 and a fluid outlet 16 that are connected by a fluid passageway 18. The fluid passageway 18 includes a first fluid port 21 and a second fluid port 23, through which fluid may flow from the fluid inlet 14 to the fluid outlet 16. In the embodiment illustrated in FIG. 1, fluid flows from the fluid inlet 16 on the left side of FIG. 1, through the fluid passageway 18, to the fluid outlet 16 on the right side of FIG. 1. In alternate embodiments, the fluid inlet 14 and the fluid outlet 16 may be reversed.

Fluid flow through the first fluid port 21 and through the second fluid port 23 is controlled by a first valve plug 20, which cooperates with a first valve seat assembly 22, and a second valve plug 24, which cooperates with a second valve seat assembly 26. The first valve plug 20 and the second valve plug 24 are operatively connected to a valve stem 28, which extends through the first fluid port 21 and the second fluid port 23 in the embodiment of FIGS. 1 and 2. However, in alternate embodiments, the valve stem need not extend through the first fluid port 21 and the second fluid port 23, but could extend through other portions of the valve body 12. The first and second fluid ports 21, 23, the valve stem 28, and the first and second valve plugs 20, 24, form a double port assembly 29. An actuator 30 is operatively connected to the valve stem 28 to move the first valve plug 20 and the second valve plug 24 relative to the first valve seat assembly 22 and to the second valve seat assembly 26, respectively.

In a first position, the first valve plug 20 is spaced apart from the first valve seat assembly 22, leaving a gap between the first valve plug 20 and the first valve seat assembly 22, and the second valve plug 24 is spaced apart from the second valve seat assembly 26, leaving a gap between the second valve plug 24 and the second valve seat assembly 26. In the first position, fluid is allowed to flow through the fluid passageway 18 from the fluid inlet 14 to the fluid outlet 16 through the first port 21 and through the second port 23. In other words, in the first position, the double port regulator 10 is open.

Figure 2:
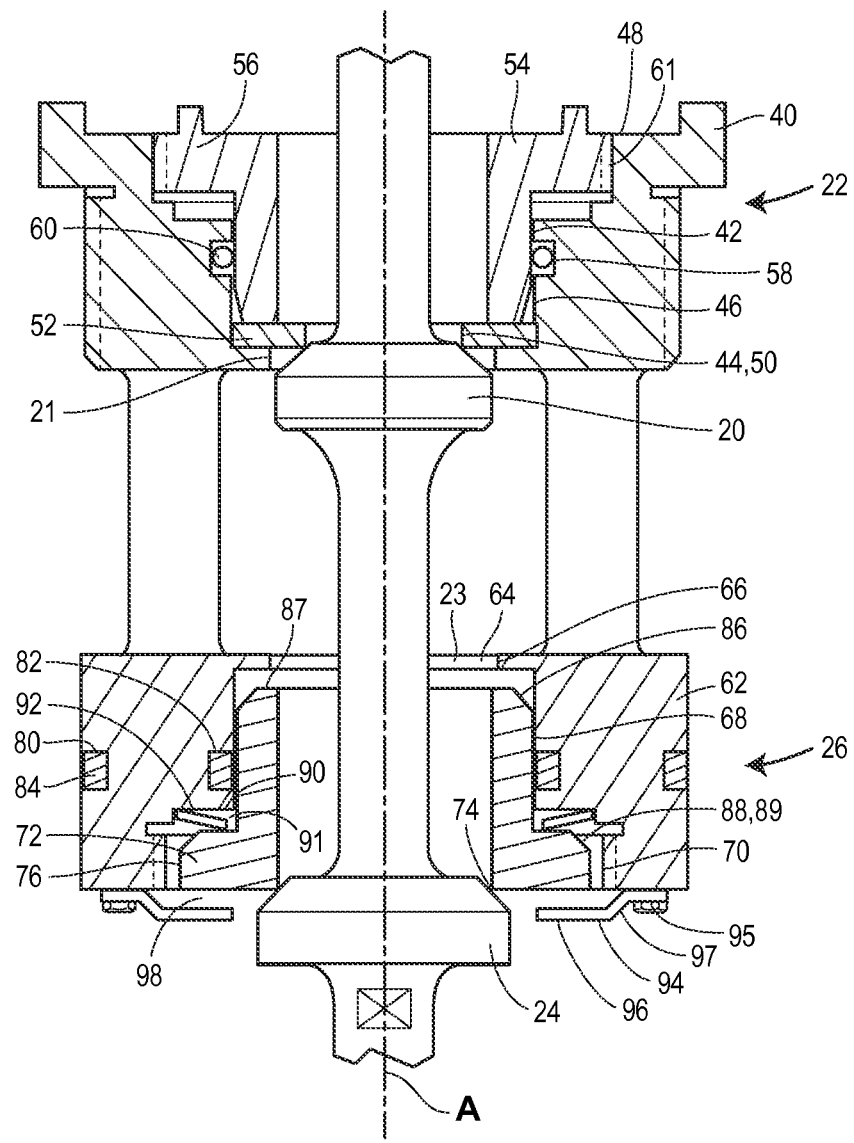
FIG. 2 is a close up cross-sectional view of a double port assembly of FIG. 1, the double port assembly having a fixed seat, a valve plug, and a floating seat.

In a second position, the first valve plug 20 contacts the first valve seat assembly 22 and the second valve plug 24 contacts the second valve seat assembly 26, as illustrated in FIG. 2. In the second position, fluid is restricted from flowing through the fluid passageway 18. In other words, in the second position, the double port regulator 10 is closed.

In a third position, which is an intermediate position, the first valve plug 20 is spaced apart from the first valve seat assembly 22, and the second valve plug 24 contacts the second valve seat assembly 26, as illustrated in FIG. 1. The intermediate position is reached when the double port regulator 10 is in the process of opening (but not completely open) or in the process of closing (but not completely closed), and fluid flows through the first fluid port 21, but not through the second fluid port 23, in the intermediate position.

The actuator 30 positions the first valve plug 20 and the second valve plug 24 to achieve a desired flow rate of fluid through the fluid passageway 18 by varying the distance between the first valve plug 20 and the first valve seat assembly 22, and by varying the distance between the second valve plug 24 and the second valve seat assembly 26. By providing for an intermediate position where only one of the valve plugs contacts a valve seat assembly, manufacturing tolerances may be reduced and shutoff metering of fluid may be improved and more precisely controlled near the cutoff point.

The actuator 30 includes a biasing element, such as an actuator spring 32 that biases a diaphragm 34 towards and/or away from the fluid flow passageway 18. The diaphragm 34 is operatively connected to a diaphragm plate 36, which is operatively connected, in turn, to the valve stem 28. The actuator spring 32 positions the diaphragm 34, which positions the diaphragm plate 36 and the valve stem 28 to locate the first valve plug 20 and to locate the second valve plug 24 as desired to control fluid flow through the fluid passageway 18.

A balance spring 33 may be located on an opposite end of the valve stem 28 from the actuator 30. The balance spring 33 generally opposes the bias of the actuator spring 32. The balance spring 33 reduces oscillations of the valve stem 28 when the valve stem 28 is positioned by the actuator 30. The balance spring 33 may be seated against the second valve plug 24 at one end and within a recess 35 in an end cap 37.

A guide sheath, such as a cylindrical guide sheath 39, may also be seated within the recess 35 and the balance spring 33 may surround the cylindrical guide sheath 39, at least partially. One end of the valve stem 28 may be seated within the cylindrical guide sheath 39 so that the cylindrical guide sheath 39 maintains proper alignment of the valve stem 28 when the valve stem is positioned by the actuator 30.

Turning now to FIG. 2, the first and second valve plugs 20, 24, and the first and second valve seat assemblies 22, 26, are illustrated in more detail. The first seat assembly 22 may be a fixed seat assembly. In other words, the fixed seat assembly does not move with respect to the valve body 12. The first seat assembly 22 includes a first or fixed seat retainer 40. The fixed seat retainer 40 includes a through bore 42 that forms the first fluid port 21. The through bore 42 may include a first portion 44 that has a first inner diameter, a second portion 46 that has a second inner diameter, and a third portion 48 that has a third inner diameter. The first inner diameter may be smaller than the second inner diameter, which may be smaller than the third inner diameter.

The first portion 44 may include a seating surface 50 that cooperates with the first valve plug 20 to close or open the first fluid port 21. A fixed seat 52 may be disposed within the second portion 46 to form the first portion 44, in one example. In other embodiments, the fixed seat 52 may be integrally formed with the fixed seat retainer 40. A fixed seat plug 54 may be disposed at least partially within the fixed seat retainer 40. The fixed seat plug 54 may include an upper flange 56, which fits within the third portion 48 of the fixed seat retainer 40. The fixed seat retainer 40 may include one or more annular channels 58 that are sized to retain a seal, such as an o-ring 60. In one embodiment, the fixed seat plug 54 is operatively connected to the fixed seat retainer 40 by a threaded connection 61. In other embodiments, other connections may be used, such as, for example, welded connections, epoxy connections, interference fit connections, crimped connections, etc.

The second seat assembly 26 may be a floating seat assembly. The floating seat assembly may include a valve seat that moves with respect to the valve body 12 or with respect to the first seat assembly 22. The second seat assembly 26 includes a second or floating seat retainer 62. The floating seat retainer 62 includes a through bore 64 that forms the second fluid port 23. The through bore 64 may include a first portion 66 that has a first inner diameter, a second portion 68 that has a second inner diameter, and a third portion 70 that has a third inner diameter. The first inner diameter may be smaller than the second inner diameter, which may be smaller than the third inner diameter.

A floating seat 72 may be at least partially disposed within the second portion 68 and the third portion 70, in one example. The floating seat 72 is movable along a longitudinal axis A of the floating seat retainer 62. The floating seat 72 may include a seating surface 74 that cooperates with the second valve plug 24 to close or open the second fluid port 23. The floating seat 72 may include a lower flange 76 that fits within the third portion 70 of the floating seat retainer 62. The floating seat retainer 62 may include one or more annular channels 78, 80 that are sized to retain a seal, such as o-rings 82, 84. The floating seat 72 may include a first chamfered surface 86 at a first end 87 and a second chamfered surface 88 in an outer surface 89 of the flange 76. The chamfered surfaces 86, 88 may improve assembly and prevent metal to metal galling as the floating seat 72 moves within the floating seat retainer 62.

The floating seat retainer 62 may include an annular shoulder 90 that forms a space 91 between the floating seat retainer 62 and the floating seat 72. A floating seat biasing element, such as a disc spring 92, is disposed within the space 91. The disc spring 92 biases the floating seat 72 away from the fixed seat assembly 22. A retainer element, such as an annular disc 94 is attached to the floating seat retainer 62 proximate the floating seat flange 76. In one embodiment, the annular disc 94 includes a base portion 95 that is connected to a retaining portion 96 by an angled portion 97. The base portion 95 and the retaining portion 96 may be parallel to one another. The angled portion 97 offsets the retaining portion 96 from the floating seat retainer 62, thereby forming a tolerance gap 98. The tolerance gap 98 is preferably between 50% and 75%, more preferably 60% and 75%, and even more preferably about 75% of the height of the lower flange 76. These preferred ranges provide enough rigidity for the annular disc 94 to retain the floating valve seat 72 against pressure loading, while keeping the valve seat assembly 26 to a relatively small overall size.

In the first position, the first valve plug 20 is spaced apart from the fixed valve seat 50, and the second valve plug 24 is spaced apart from the floating seat 72. As the actuator 30 begins to move the valve stem 28 towards the second, closed position, initially, the second valve plug 24 will contact the floating valve seat 72, because the floating valve seat 72 is biased downward in FIGS. 1 and 2, towards the second valve plug 24. Thus, the second port 23 is closed before the first port 21 is closed. After the second valve plug 24 contacts the floating valve seat 72, the valve stem 28 continues to move towards the second, closed position. The actuator 20 overcomes the force provided by the disc spring 92 and the floating valve seat 72 is pushed upward in FIGS. 1 and 2, towards the fixed valve seat assembly 22. Eventually, the first valve plug 20 contacts the fixed valve seat 50, which prevents further movement of the valve stem 28, which is now in the second, closed position with both the first and second fluid ports 21, 23 being closed to fluid flow.

Although certain double port regulators have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur to one of ordinary skill in the art.

The invention claimed is:

1. A double port assembly for a double port regulator, the double port assembly comprising:
    a first fluid port and a second fluid port;
    a valve stem that extends through both the first fluid port and the second fluid port, the valve stem including a first valve plug and a second valve plug;
    a fixed valve seat assembly proximate the first fluid port;
    a floating valve seat assembly proximate the second port, the floating valve seat assembly including a floating seat retainer having a through bore that forms the first fluid port and a floating seat disposed at least partially within the floating seat retainer, the floating seat being movable along a longitudinal axis of the floating seat retainer; and
    a rigid retainer element disposed on the floating seat retainer, the retainer element limiting longitudinal movement of the floating valve seat, the retainer element being an annular disc including a base portion connected to a retaining portion by an angled portion.

2. The double port assembly of claim 1, the floating seat retainer including an annular shoulder that forms a space between the floating seat retainer and the floating seat.

3. The double port assembly of claim 2, further comprising a biasing element disposed within the space between the floating seat retainer and the floating seat.

4. The double port assembly of claim 3, wherein the biasing element is a disc spring.

5. The double port assembly of claim 1, the floating seat retainer including a first portion having a first inner diameter, a second portion having a second inner diameter, and a third portion having a third inner diameter, the first inner diameter being smaller than the second inner diameter, and the second inner diameter being smaller than the third inner diameter.

6. The double port assembly of claim 5, the floating seat including a lower flange that is at least partially disposed within the third portion.

7. The double port assembly of claim 6, the floating seat including a chamfered surface on an outer surface of the lower flange.

8. The double port assembly of claim 1, the floating seat including a chamfered surface proximate a first end.

9. The double port assembly of claim 1, the retaining portion being offset from the floating retainer by a tolerance gap.

10. The double port assembly of claim 9, wherein the tolerance gap is between 50% and 75% of a height of a lower flange of the floating seat.

* * * * *